United States Patent [19]

Hashimoto et al.

[11] Patent Number: 5,326,736
[45] Date of Patent: Jul. 5, 1994

[54] AMORPHOUS ALLOY CATALYSTS FOR CONVERSION OF EXHAUST GASES TO HARMLESS GASES

[75] Inventors: Koji Hashimoto, 25-5, Shogen 2-Chome, Izumi-ku, Sendai-shi, Miyagi-ken; Kiyohiro Teruuchi, Sendai; Hiroki Habazaki, Sendai; Asahi Kawashima, Sendai; Katsuhiko Asami, Sendai, all of Japan

[73] Assignees: Koji Hashimoto; Daiki Engineering Co., Ltd., Japan

[21] Appl. No.: 856,159

[22] PCT Filed: Sep. 27, 1989

[86] PCT No.: PCT/JP89/00979
§ 371 Date: Apr. 1, 1992
§ 102(e) Date: Apr. 1, 1992

[87] PCT Pub. No.: WO91/04790
PCT Pub. Date: Apr. 18, 1991

[51] Int. Cl.$^5$ ............ B01J 23/89; B01J 21/06; B01J 27/128; B01D 53/36
[52] U.S. Cl. ................ 502/326; 423/213.5; 423/239.1; 423/247; 502/227; 502/229
[58] Field of Search .......... 502/326, 223, 229

[56] References Cited

U.S. PATENT DOCUMENTS

| | | | |
|---|---|---|---|
| 4,091,072 | 5/1978 | McArthur | 502/326 X |
| 4,492,769 | 1/1985 | Blanchard et al. | 502/326 X |

FOREIGN PATENT DOCUMENTS

| | | |
|---|---|---|
| 58-159847 | 9/1983 | Japan. |
| 62-96633 | 5/1987 | Japan. |
| 62-96634 | 5/1987 | Japan. |
| 62-96636 | 5/1987 | Japan. |

*Primary Examiner*—Paul E. Konopka
*Attorney, Agent, or Firm*—Larson and Taylor

[57] ABSTRACT

This invention relates to a catalyst for cleaning exhaust gas, which is prepared by dipping in hydrofluoric acid an amorphous alloy composed of 20 to 80 atom % of one or more elements selected from the group consisting of Nb, Ta, Ti and Zr (the sum of Nb and Ta being up to 70 atom %), 0.5 to 20 atom % of one or more elements selected from the group consisting of Ru, Pd, Rh, Pt and Ir, and the balance of one or two of Ni and Co. This catalyst can clean at a low temperature an exhaust gas containing NO or CO discharged from apparatuses or engines wherein various organic substances are burnt.

1 Claim, 1 Drawing Sheet

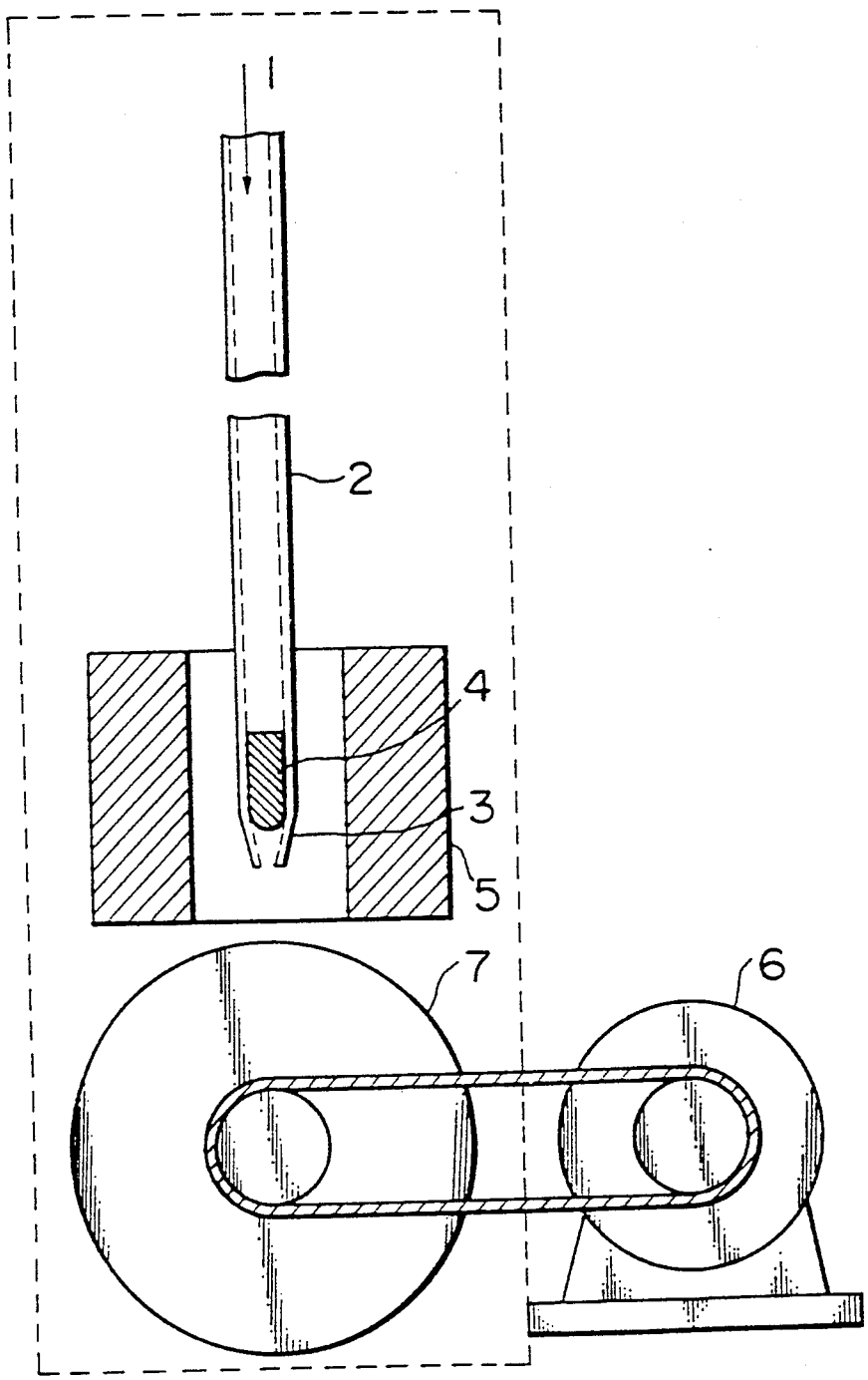

AMORPHOUS ALLOY CATALYSTS FOR CONVERSION OF EXHAUST GASES TO HARMLESS GASES

TECHNICAL FIELD

The present invention relates to highly active catalysts for conversion of combustion exhaust gases to harmless gases; catalysts being easily produced and recovered by simple methods.

BACKGROUND ARTS

Apparatuses and engines, burn various organic substances, exhaust gases containing NOx, CO, unburnt hydrocarbons, etc. Such exhaust gases have so far been converted basically by reactions to change carbon compounds into carbon dioxide and water and to change nitrogen oxides into nitrogen gas, using catalysts of platinum group elements carried by ceramics.

One of the present inventors filed an application for patent registration of amorphous alloy electrode materials containing Ni-Ta-Pt group metals as essential components, for generation of oxygen gas in the hydrolysis of aqueous solutions, under Japanese Patent Kokai No. 61-281889.

Furthermore, three of the present inventors filed applications for patent registration of surface activated amorphous alloys as electrodes for electrrolyzing solutions, comprising one or more elements of Ti, Zr, Nb and Ta, and Ni and platinum group metals, and also of an activation treatment process for them under Japanese Patent Kokai Nos. 62-96633, 62-96634 and 62-96636 and moreover filed an application for patent registration of similar surface activated supersaturated solid solution alloys for electrodes for electrolyzing solutions and also of an activation treatment process for them under Japanese Patent Kokai No. 62-96635.

In addition, the present inventors found surface activated amorphous alloys for methanol based fuel cells, and filed an application for patent registration under Japanese Patent Kokai No. 63-11647.

The conventional catalysts with platinum group elements carried by ceramics used for conversion of the exhaust gases from various apparatuses and engines burning various organic substaces are high in reaction temperature and difficult to recover expensive platinum group elements.

Therefore, the development of any catalysts which can act at low temperatures to convert low temperature exhaust gases in the beginning of combustion, are high in activity and can be easily regenerated has been awaited.

DISCLOSURE OF THE INVENTION

The present invention relates to catalysts for conversion of exhaust gases to harmless gases, comprising an amorphous alloy consisting of 20-70 at % of at least one element selected from Nb and Ta, 0.5-20 at % of at least one element selected from Ru, Pd, Rh, Pt and Irt, with the balance being substantially at least one element selected from Ni and Co, having been subjected to activation treatment by immersion in hydrofluoric acid; catalysts for conversion of exhaust gases to harmless gases, comprising an amorphous alloy consisting of 20-80 at % of at least one element selected from Ti and Zr, 0.5-20 at % of at least one element selected from Ru, Pd, Rh, Pt and Ir, with the balance being substantially 10 at % of at least one element selected from Ni and Co, having been subjected to activation treatment by immersion in hydrofluoric acid; and catalysts for conversion of exhaust gases to harmless gases, comprising an amorphous alloy consisting of at most 70 at % of at least one element selected from Nb and Ta, and 20-80 at % in the sum of at least one element selected from Nb and Ta and at least one element selected from Ti and Zr, 0.5-20 at % of at least one more element selected from Ru, Pd, Rh, Pt and Ir, with the balance being substantially at least 10 at % of at least one element selected from Ni and Co, having been subjected to activation treatment by immersion in hydrofluoric acid.

The present invention provides catalysts which can convert gases containing NOx, CO, unburnt hydrocarbons, etc. from apparatuses and engines using various organic fuels to harmless gases based on the reactions changing carbon compounds into carbon dioxide and water, and nitrogen oxides into nitrogen at temperatures close to room temperature, and the catalysts have high activity and easily produced and regenerated.

BRIEF DESCRIPTION OF THE DRAWING

FIG. 1 is a schematic sectional view showing apparatus for producing the alloys of the present invention as an example.

THE BEST CONFIGURATION FOR EXECUTING THE INVENTION

Usually an alloy is crystalline form in the solid state. However, if an alloy with a specified composition is rapidly solidified from the molten state or produced in any other way to avoid the formation of long-range atomic ordering at solidification, an amorphous structure similar to a liquid structure different from crystalline structure can be obtained, and such an alloy is called an amorphous alloy. An amorphous alloy is usually a homogeneous single-phase alloy of a supersaturated solid solution, and has a very high mechanical strength compared with conventional practical metals, exhibiting various properties such as abnormally high corrosion resistance, depending on its composition.

On the other hand, the conventional catalysts for the conversion of exhaust gases to harmless gases are usually effective at high temperatures, and any catalysts which are capable of converting low temperature harmful gases in the beginning of combustion or low concentration harmful gases from fossil fuel burning equipments on houses to harmless gases had not been developed.

In this regard, for the purpose of obtaining metallic materials with high electrocatalytic activity and high corrosion resistance in the electrolysis of aqueous solutions, three of the present inventors prepared amorphous alloys and supersaturated solid solution alloys containing small amounts of platinum group metals, and treated them for activation by utilizing the property that an amorphous alloy or supersaturated solid solution alloy is very highly homogeneous, and they found highly active and highly corrosion resistant electrode materials to be used for eiectrolyzing aqueous solutions. For these materials, an application for patent registration of oxygen generating electrode materials for the electrolysis of aqueous solutions was filed under Japanese Patent Application No. 85-123111, and applications for patent registration of chlorine generating electrode materials for the electrolysis of sodium chloride aqueous solution were filed under Japanese Patent Application Nos. 85-169764, 85-169765, 85-169766 and 85-169767. Furthermore, three of the present inventors studied for the purpose of obtaining electrode materials effective for electrolytic oxidation of methanol by utilizing the properties of amorphous alloys, and found that an amorphous (Ni and/or Co) - valve metal (Ti, Zr, Nb and/or Ta) alloys containing a small amount of Pt, if necessary further containing other platinum group elements than Pt, and Ti, Si, Ge, Pb and/or Bi for assisting the action of Pt are highly active metal electrodes for the electrolytic oxidation of methanol if the amorphous alloy is immersed in hydrofluoric acid. An application for patent registration of the materials was filed under Japanese Patent Application No. 86-154570.

Based on the results of these studies, the present inventors studied on the catalysts which can convert exhaust gases generated by combustion of fossil fuels to harmless gases, even at temperatures close to room temperature, and found that high performance catalysts can be obtained from similar amorphous alloys. Thus, the present invention has been achieved.

The present invention comprises claims 1 to 3, and provides catalysts high in activity and easy to produce and recover, obtained by hydrofluoric acid treatment of amorphous alloys consisting of Co or Ni and valve metals, and further containing small amounts of platinum group elements acting catalytically for conversion of exhaust gases to harmless gases.

Table 1 shows the component elements and contents stated in claims 1 to 3.

TABLE 1

| | Compositions of alloys of the present invention (at %) | | | |
|---|---|---|---|---|
| Claim | Ta, Nb (*1) | Ti, Zr (*2) | Ru, Rh, Pd Pt, Ir (*3) | Ni, Co (*4) |
| 1 | 20-70 | | 0.5-20 | Balance |
| 2 | | 20-80 | 0.5-20 | Balance (but 10 or more) |
| 3 | At most 70 | 20-80 (*5) | 0.5-20 | (but 10 or more) |

(*1). At least one element selected from Ta and Nb
(*2). At least one element selected form Ti and Zr
(*3). at least one element selected from Ru, Rh, Pd, Ir and Pt
(*4). The balance being substantially at least one element selected from Ni and Co.
(*5). The sum of at least one element selectef from Ti and Zr and at most 70 at % of at least one element selected from Ta and Nb To obtain a catalyst with selectively high catalytic activity for specific chemical reactions and easy to produce and reproduce, it is more convenient to use an alloy containing required amounts of effective elements than platinum group elements carrying alumina, titania or silica. However, a crystalline metal prepared by any ordinary method to contain large amounts of various alloying elements forms a multiphase structure with heterogeneous chemical properties, and hardly show specific properties of solid solution. In addition, because of brittleness, it is difficult to obtain a material with a large specific surface area required for a catalyst.

On the contrary, an amorphous alloy of the present invention obtained by rapid quenching of a molten alloy composed as described above consists of a simple phase solid solution and has excellent mechanical properties such as high strength and toughness, since the solid phase is in principle, formed by rapid quenching without permitting the localization of component elements. If it is immersed in hydrofluoric acid for activation treatment, the elements not so effective for catalytic activity such as valve metals, nickel and cobalt are dissolved into hydrofluoric acid, with a consequent accumulation of the platinum group elements with high catalytic activity in the surface. In this case, since the amor-phous alloy is a homogeneous solid solution, the platinum group elements, which are homogeneously distributed in the alloy, act as cathodes on which hydrogen is evolved violently in hydrofluoric acid. Hydrogen evolution assures the dissolution of the elements not so effective for catalytic activity. Therefore, in an amorphous alloy containing homogeneously dissolved platinum group elements, the dissolution of the elements not so effective for catalytic activity occurs homogeneously and quickly, and thus, a highly active catalyst, which has a large surface area and contains concentrated platinum group elements effective for catalytic activity, can be quickly produced.

Consequently, a catalyst, which can act even at relatively low temperatures close to room temperature for conversion of exhaust gases to harmless gases, can be realized by an amorphous alloy catalyst of the present invention obtained after activation by immersion of the alloy composed as above in hydrofluoric acid.

The reasons for limiting the respective ingredients in the present invention are stated below.

Ni and Co are basic elements of the alloys of the present invention and form an amorphous structure in the coexistence with one or more of Ti, Zr, Nb and Ta. In the first version of the present invention in which Ni and/or Co and Ta and/or Nb coexist, an amorphous structure can be easily obtained if the amount of Ta and/or Nb is 20 to 70 at %. In the second version of the present invention in which 10 at % or more of Ni and/or Co and Ti and/or Zr coexist, an amorphous structure can be easily obtained if the amount of Ti and/or Zr is 20 to 80 at %. Furthermore, in the third version of the present invention in which Ti and/or Zr and Nb and/or Ta exist together with Ni and/or Co, an amorphous structure can be easily obtained if the total amount of Nb and/or Ta and Ti and/or Zr is 20 to 80 at % with the amount of Nb and/or Ta kept at 70 at % or less.

Platinum group elements, Ru, Rh, Pd, Ir and Pt give catalytic activity, but if they are contained too much, the catalyst becomes expensive, and dissolution of unrequired elements by hydrofluoric acid treatment becomes difficult. The excessive addition of platinum group elements, therefore, makes it difficult to increase the surface area and to concentrate platinum group elements on the surface by hydrofluoric acid treatment. Therefore, in the present invention, the amount of platinum group elements must be kept in a range from 0.5 to 20 at %, preferably 1 to 10 at %.

For preparing an amorphous alloy of the present invention, the already widely used method of forming an amorphous alloy by rapidly quenching of a liquid alloy is used.

An apparatus for preparing the amorphous alloys of the present invention is shown in FIG. 1 as an example. The space surrounded. by the dotted line is evacuated and filled with an inactive gas. In FIG. 1, symbol 2 denotes a quartz tube with a vertical nozzle 3 at the bottom end. From an inlet 1 at the top of the quartz tube 2, a raw material 4 and an inactive gas for preventing the oxidation of the raw material can be fed in. To heat the raw material, a heating furnace 5 is installed around the quartz tube 2. A roll 7 rotated at a high speed is placed vertically below the nozzle 3, and is rotated by a motor 6. For preparing of an amorphous alloy, the raw material 4 with a predetermined compositon is put into the quartz tube 2, and the apparatus is evacuated to about $10^{-3}$ Torr and is subsequently filled with an inactive gas. The raw material 4 is heated and molten by the heating furnace 5, and ejected onto the circumferential surface of the roll 7 rotated at a high speed of 1000 to 10000 rpm by the motor 6. By this method, for example, an amorphous alloy of the present invention can be obtained as a long thin sheet of 0.1 mm in thickness, 10 mm in width and several meters in length.

EXAMPLE 1

Raw alloys were prepared by mixing elements to achieve compositions as shown in Table 2 and melting by an argon arc melting furnace. These alloys were remolten in argon atmosphere and tepidly solidified using the single roller quenching method shown in FIG. 1, to obtain thin amorphous alloy sheets of 0.01 to 0.05 mm in thickness, 1 to 3 mm in width and 3 to 20 mm in length. The formation of amorphous structures was confirmed by X ray diffraction. These alloy samples were immersed in is 46.5% hydrofluoric acid for 300 to 900 seconds, to obtain highly active metallic catalysts. A quartz tube of 8 mm in inner diameter was filled with 0.5 g of any of the catalysts obtained like this to a length of 5 cm, and installed as a reactor tube in an electric furnace. Nitrogen gas containing 243 ppm, by mole ratio, each of NO and CO was fed into the reactor tube at a flow velocity of 100 mm/min, and the amounts of CO and NO at the outlet of the reactor tube were measured by a gas chromatograph and NO meter respectively. The results obtained are also shown in Table 2.

TABLE 2

| Conversion of gas containing NO and CO | |
|---|---|
| Alloy (at %) | Temperature at which 100% NO and CO were converted into $N_2$ and $CO_2$ (°C.) |
| Ni—30Ta—2RH | 165 |
| Ni—30Ta—2Pt | 175 |
| Ni—30Ta—2Ir | 190 |
| Ni—30Ta—2Pd | 240 |
| Ni—30Ta—2Ru | 250 |
| Ni—30Ta—3Rh | 190 |
| Ni—40Nb—2Rh | 170 |
| Ni—40Nb—2Ru | 250 |
| Ni—40Ta—30Nb—10Rh | 200 |
| Ni—10Ta—10Nb—0.5Rh | 230 |
| Ni—20Ta—20Nb—10Rh—10Ru | 270 |
| Ni—20Co—30Ta—10Nb—2Rh | 170 |
| Co—40Nb—3Rh | 190 |
| Ni—70Ti—0.5Ru | 260 |
| Ni—40Zr—0.25Rh—0.25Pt | 210 |
| Ni—20Zr—1Pt | 175 |
| Ni—40Ti—40Zr—3Ir | 190 |
| Co—20Zr—5Pd | 250 |
| Co—20Ti—20Pd | 260 |
| Ni—20Co—40Zr—1Pd—1Rh—1Ru—0.5Pt | 180 |
| Ni—70Ta—10Ti—1Pd | 250 |
| Ni—10Ta—30Nb—20Zr—1Pd | 260 |
| Ni—10Ta—10Nb—20Ti—20Zr—3Ru | 270 |
| Co—30Nb—10Zr—3Ir | 200 |
| Ni—30Co—10Ta—10Nb—10Ti—10Zr—0.25Ir—0.25Rh | 190 |

EXAMPLE 2

Raw alloys were prepared by mixing raw metals to achieve compositions as shown in Table 3 and melting by an argon arc melting furnace. These alloys were remolten in argon atmosphere and rapidly solidified using the single roller quenching method shown in FIG. 1, to obtain thin amorphous alloy sheets of 0.01 to 0.05 mm in thickness, 1 to 3 mm in width and 3 to 20 mm in length. The formation of amorphous structures was confirmed by X ray diffraction. These alloy samples were immersed in 46.5% hydrofluoric acid for 300 to 900 seconds, to obtain highly active metallic catalysts. A quartz tube of 8 mm in inner diameter was filled with 0.5 g of any of the catalysts obtained like this to a length of 5 cm, and installed as a reactor tube in an electric furnace. Nitrogen gas containing 0.505 mole % of CO and 0.489 mole % of $O_2$ was fed into the reactor tube at a flow velocity of 33 mm/min, and the amounts of CO and $O_2$ at the outlet of the reactor tube were measured by a gas chromatograph. The results obtaiend are also shown in Table 3. These alloy catalysts could be very easily taken out of the reactor tubes, and could be regenerated without any trouble after they had been contaminated on the surface by actual reactions.

TABLE 3

| Conversion of gas containing CO | |
|---|---|
| Alloy (at %) | Temperature at which 100% CO was converted into $CO_2$ (°C.) |
| Ni—30Ta—1Rh | 205 |
| Ni—30Ta—2Ru | 190 |
| Ni—30Ta—3Ru | 180 |
| Ni—30Ta—2Rh | 140 |
| Ni—30Ta—3Pd | 110 |
| Ni—30Ta—1Ir | 110 |
| Ni—30Ta—2Ir | 140 |
| Ni—30Ta—3Ir | 130 |
| Ni—30Ta—2Pt | 105 |
| Ni—40Ta—30Nb—10Rh | 170 |
| Ni—10Ta—10Nb—0.5Rh | 160 |
| Ni—20Ta—20Nb—10Rh—10Ru | 200 |
| Ni—20Co—30Ta—10Nb—2Rh | 160 |
| Co—40Nb—3Rh | 160 |
| Ni—70Ti—0.5Ru | 180 |
| Ni—40Zr—0.25Rh—0.25Pt | 140 |
| Ni—20Zr—1Pt | 110 |
| Ni—40Ti—40Zr—3Ir | 110 |
| Co—20Zr—5Pd | 120 |
| Co—20Ti—20Pd | 120 |
| Ni—20Co—40Zr—1Pd—1Rh—1Ru—0.5Pt | 130 |
| Ni—70Ta—10Ti—1Pd | 120 |
| Ni—10Ta—30Nb—20Zr—1Pd | 130 |
| Ni—10Ta—10Nb—20Ti—20Zr—3Ru | 200 |
| Co—30Nb—10Zr—3Ir | 130 |
| Ni—30Co—10Ta—10Nb—10Ti—10Zr—0.25 Ir—0.25 Rh | 110 |

As can be seen from the above, the amorphous alloy catalysts of the present invention for conversion of exhuast gases to harmless gases allow exhaust gases to be converted at very low temperatures, and have very high activity.

As described above, even though the amorphous alloys of the present invention are very low in the content of expensive platinum group elements, the highly active catalysts prepared by treating them by hydrofluoric acid exhibit very high catalytic activity, and thus have high catalytic activity to be able to convert exhaust gases to harmless gases at low temperatures.

Furthermore, the highly active catalysts of the present invention are prepared by hydrofluoric acid immersion of an amorphous alloy ribbon formed by any method rapid quenching from the liquid state such as single roller quenching method generally used for preparation of amorphous alloys. Therefore, no special apparatus is required.

Thus, the preparation of highly active catalysts of the present invention does not require any specially complicated or expensive operation, and the highly active catalysts thus prepared of the present invention have excellent catalytic activity and can be easily regenerated, being practically excellent.

We claim:

1. Catalysts for conversion of exhuast gases to harmless gases, comprising an amorphous alloy consisting of 20–80 at % of at least one element selected from Ti and Zr, 0.5–20 at % of at least one element selected from Ru, Pd, Rh, Pt and Ir, with the balance being substantially 10 at % of at least one element selected from Ni and Co, having been subjected to activation treatment by immersion in hydrofluoric acid.

* * * * *